April 21, 1964     D. A. RUDD     3,130,262
BEAM-INDEXING PICTURE DISPLAY SYSTEM
Filed July 19, 1960     5 Sheets-Sheet 1

INVENTOR
DENNIS A. RUDD

BY
AGENT

April 21, 1964 D. A. RUDD 3,130,262
BEAM-INDEXING PICTURE DISPLAY SYSTEM
Filed July 19, 1960 5 Sheets-Sheet 4

INVENTOR
DENNIS A. RUDD
BY
AGENT

April 21, 1964     D. A. RUDD     3,130,262
BEAM-INDEXING PICTURE DISPLAY SYSTEM
Filed July 19, 1960     5 Sheets-Sheet 5

INVENTOR
*DENNIS A. RUDD*

BY
AGENT 3,130,262
BEAM-INDEXING PICTURE DISPLAY SYSTEM
Dennis Arthur Rudd, Redhill, England, assignor to North American Philips Company, Inc., New York, N.Y., a corporation of Delaware
Filed July 19, 1960, Ser. No. 43,814
Claims priority, application Great Britain Aug. 5, 1959
6 Claims. (Cl. 178—5.4)

The invention relates to a beam-indexing display arrangement for the display of colour television pictures comprising a cathode-ray tube having an electron gun with a beam-intensity control electrode and a screen comprising an iterative pattern of groups of at least two luminescent stripes adapted each to produce light in a differing colour, means for deflecting an electron beam in said tube so as to cause line and field scanning and cause the beam to sweep successive groups of luminescent stripes in a continuous sequence, means for applying to said beam-intensity control electrode a beam-modulating signal of substantially sinusoidal form having amplitude and phase which are functions of hue and saturation of the colour signals to be displayed and a periodicity such that one cycle corresponds to the scanning of one group of luminescent stripes, an iterative pattern of at least two indexing stripes for each group of luminescent stripes which indexing stripes are either constituted by said luminescent stripes or are other stripes parallel thereto so arranged that each indexing group is associated in the same way with one of the groups of luminescent stripes, means associated with the indexing stripes for detecting the passage of said beam across any one of said stripes.

In the beam-indexing type of colour television display tube, information is derived either continuously or periodically about the position of the electron beam relative to the array of colour-producing elements on the tube screen. This information is used either to maintain the correct positional relationship between the electron beam and the array of elements, or to maintain the correct time relationship between the said signal which is applied to the beam intensity control electrode of the display tube and the beam position.

Many forms of tube and circuit arrangement have been described or suggested. In one arrangement a single-gun cathode-ray tube is used, and the array of colour-producing elements takes the form of fine parallel stripes of phosphors orientated vertically and arranged in the repetitive sequence red, blue, green, red, blue, green . . . (this type of sequence is known as a "continuous" sequence by contrast with so-called "reversing" sequences). Between adjacent phosphor stripes there may be provided non-luminescent guard-bands whose function is to assist in the achievement of saturated colours. In such so-called "decoding at the gun" principle (which means that demodulation of the colour signals which are modulated on a sub-carrier wave, are not demodulated separately but in the picture tube itself) the difficulty arises that the phase of the two indexing signals obtained from the two indexing stripes (or if desired three indexing stripes which means that three indexing signals can be obtained) depends upon the hue and saturation of the beam modulating signal thus giving no good information about the position of the electron beam when passing along the indexing stripes.

To overcome this difficulty the circuit arrangement in accordance with the invention treats the indexing signals in a special manner and is therefore characterized in that means are present for generating a first approximately sinusoidal partial indexing signal, when the beam passes the first indexing stripes of all the groups, further means for generating a further partial indexing signal of approximately sinusoidal form when the beam passes the second indexing stripes of the groups, means for shifting the phase of said partial indexing signals so as to bring all the partial indexing signals substantially to the same phase in the absence of beam modulation, means for subsequently adding the partial indexing signals together so as to produce a final indexing signal of approximately sinusoidal form for controlling the desired relationship between the phase of said beam-modulating signal and the instantaneous position of the beam with respect to the luminescent stripes so as to provide substantially the desired colour rendering.

Some embodiments of the invention will now be described, by way of example, with reference to the accompanying drawings in which:

FIG. 1 shows the several luminescent stripes of the picture tube screen with guard-bands situated between them.

FIG. 2A–E shows several graphs for explanation of the "decoding at the gun" principle.

FIG. 6A–F shows some graphs for explanation of the phase of the developed index signal when the beam modulating signal contains colour information with respect to the index signals when the said signal contains no colour information.

Figure 7:
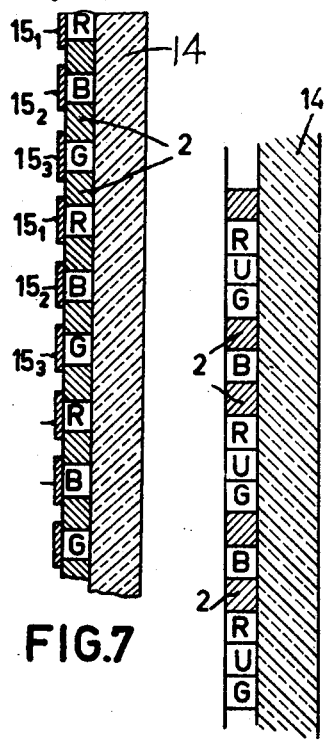

FIG. 7 shows another construction of the picture tube screen in which several indexing stripes with a secondary emission coefficient arranged in front of the luminescent stripes are shown.

Figure 8:
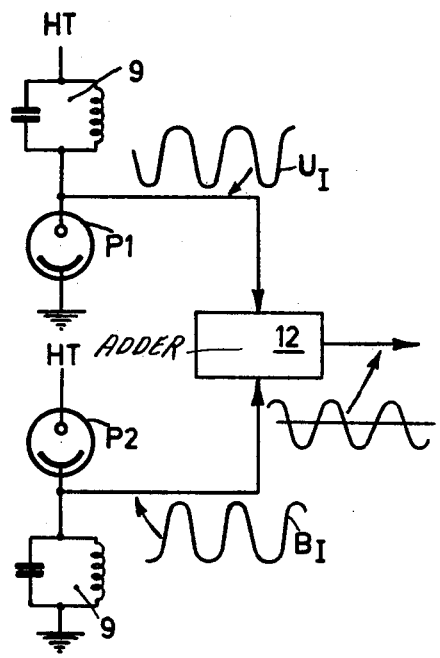
Figure 9:
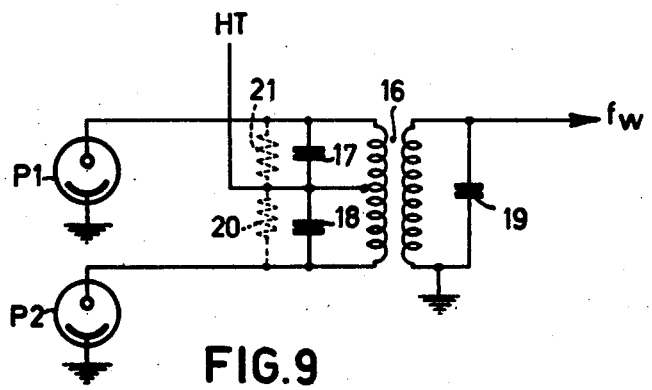

FIG. 8 shows still another embodiment of the invention in which only two photocell indexing devices are used and FIG. 9 shows a further embodiment which is only slightly different from that of FIG. 8.

Figure 1:
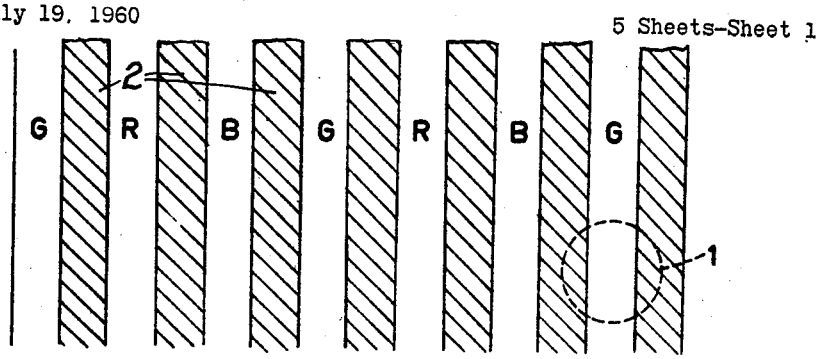

FIG. 1 of the diagrammatic drawings shows a typical structure for a section of the tube screen in relation to a typical approximation of the spot size. As the electron beam is deflected horizontally across the screen, the phosphors on the stripes G, R and B luminesce in sequence in the colours green, red and blue, the amount of light that is emitted by a particular phosphor being determined by the signal applied to the tube at the instant the beam strikes that phosphor. Between these phosphor stripes G, R and B are arranged guard bands 2.

The frequency at which a triplet of phosphor stripes is scanned is termed the "writing frequency" ($f_w$). FIGURE 2 demonstrates how the application of a sinusoidal wave at the writing frequency may produce a colour of any desired hue or saturation.

Figure 2A:
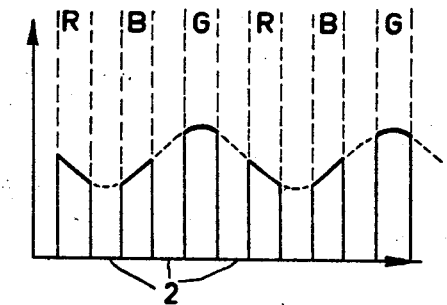
Figure 2B:
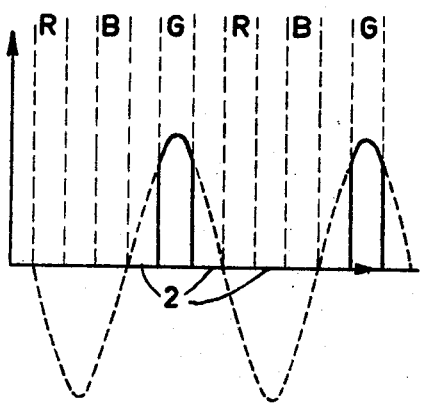

In FIGURE 2A, which shows the phase of the sinusoidal wave form applied to beam-intensity control electrode with respect to the stripes G, R and B for the reproduction of a desaturated green colour, the maximum of the sine-wave coincides with the centre of the green phosphor stripe G. A certain amount of green light and smaller, equal amounts of blue and red light are therefore produced, so that the eye perceives a desaturated green colour. By increasing the sine-wave amplitude a saturated green may be produced (FIGURE 2B). In this case the beam current is zero when the beam is due to cross the red R and blue B phosphor stripes.

Figure 2C:
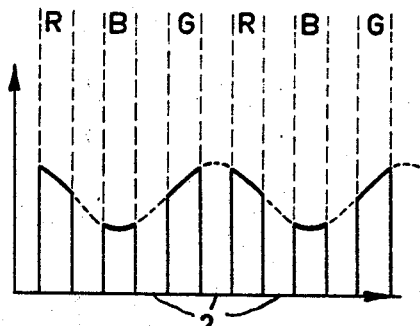
Figure 2D:
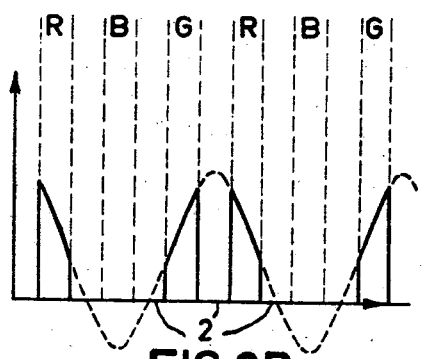

FIGURE 2C shows a signal for the reproduction of desaturated yellow which has the same amplitude but of course a different phase with respect to that shown in FIGURE 2A. The sine-wave maximum of this last said signal coincides with the centre of the guard-bands 2 between the red R and green G phosphor stripes, so that equal amounts of red and green light, and a smaller amount of blue light, are produced. The eye therefore sees a desaturated yellow colour. Saturated yellow may be produced by increasing the sine-wave amplitude (FIGURE 2D).

Figure 2E:
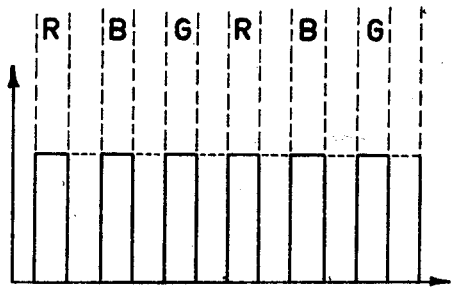

White colour is seen when the sine-wave amplitude is zero and a constant voltage is applied to the control electrode (FIGURE 2E). In this case equal amounts of red, green and blue light are produced.

This hue of the colour produced depends on the phase of the sine-wave, and the saturation depends on its amplitude and upon the D.C. component of the signal. This D.C. component is, of course, a varying quantity dependent on picture content and is normally known as the "monochrome" component. Likewise, the sine-wave component has varying phase and amplitude each dependent on picture content and is known as the "sequential" or "dot-sequential" component. This signal is thus very similar to the NTSC signal, and a NTSC signal can be converted into the corresponding signal components by using an appropriate circuit, e.g. as described by B. D. Loughlin in Proc. I.R.E. of January 1954 (pp. 299–308).

The modifying circuit which changes the NTSC signal into a sequential signal does not alter the signal frequency; i.e. it produces the sequential signal at subcarrier frequency (denoted by $f_{sc}$). Thus the sequential signal has to be converted from subcarrier frequency to writing frequency, and this is performed in a frequency changer or mixer circuit.

Thus if a signal of frequency $f_w - f_{sc}$ of constant amplitude and phase, is injected into a mixer with the sequential signal of frequency $f_{sc}$, the sum frequency component of the output will be of frequency $f_w$, and it will carry the phase and amplitude variations of the sequential signal. This output is thus suitable for applications to the beam-intensity control electrode of the display tube. The signal of frequency $(f_w - f_{sc})$ must, however, follow exactly the variations in $f_w$. These variations will occur as a result of horizontal scan non-linearity, changes in raster width, imperfections in the phosphor stripe laying process, etc. This signal is therefore derived from the display tube screen itself, so that these variations in $f_w$ may be exactly followed.

Figure 3:
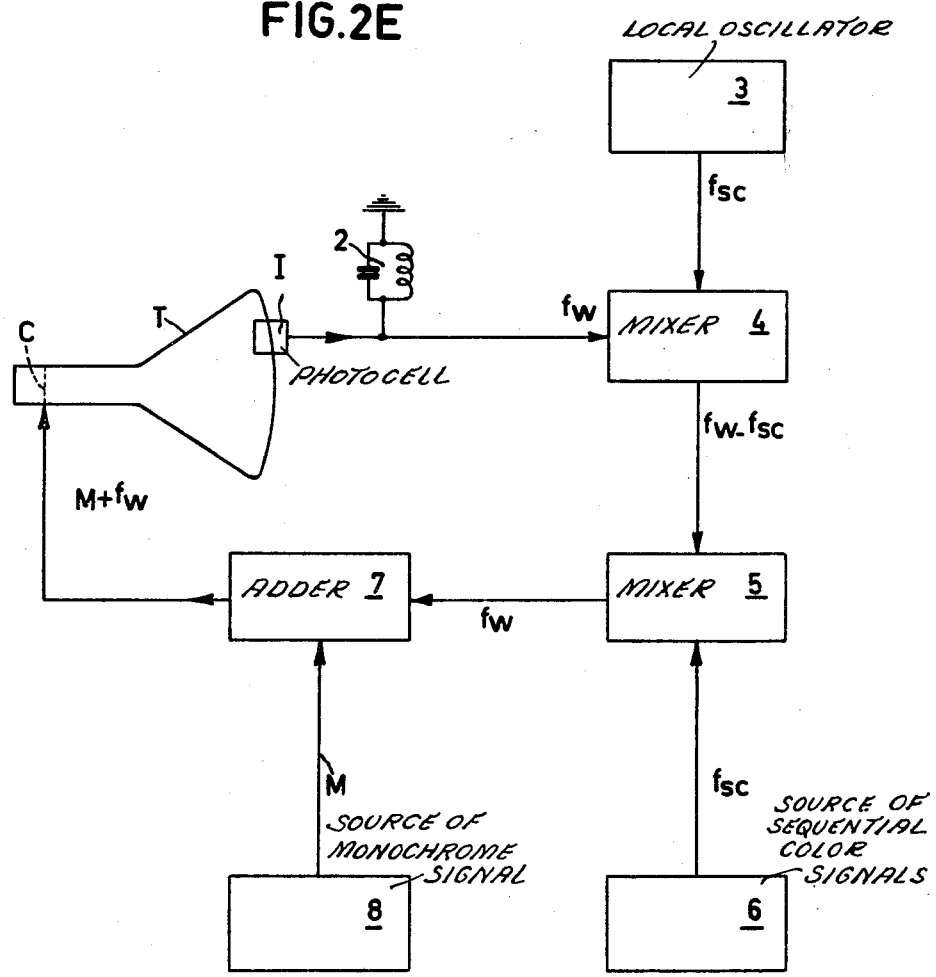
FIG. 3 shows an arrangement with only one index stripe in each group.

Such derivation of the indexing signal from the screen can be effected in various ways. A possible way is shown in FIG. 3 in which some means are shown, indicated generically at I in a schematic manner, for detecting the motion of the beam across the phosphor pattern. Let it be assumed, for the sake of illustration, that means I is a photocell sensitive to blue and placed in a position where it can view the screen as a whole. Let it also be assumed that a constant voltage is applied to the control electrode C of picture tube T, so that white is displayed. The photocell I will generate pulses at a rate equal to the writing frequency $f_w$. If the photocell I has as its load a tuned circuit 2 of resonant frequency $f_w$, a sinewave will be generated whose frequency is $f_w$. This sine-wave will follow the variations in the writing frequency $f_w$ that occur, and it will have a constant phase with respect to the phosphor stripes. If it is heterodyned with the subcarrier signal $f_{sc}$, which is generated in a local oscillator 3, in a first frequency changer 4 and the difference frequency $(f_w - f_{sc})$ is selected at the output of 4. The resulting signal $(f_w - f_{sc})$ has the requirements described above. Other physical phenomena may be employed to obtain an indexing signal besides photoemission; for example stripes of material having a comparatively large secondary emission ratio may be laid behind a given coloured stripe of each triplet, and the secondary emission current used to actuate means I so as to generate the indexing signal.

FIGURE 3 shows also a second frequency changer or mixer 5. To the mixer 5 the difference signal $(f_w - f_{sc})$ is applied and also the sequential colour signal $f_{sc}'$. This signal $f_{sc}'$ contains the desired information about hue and saturation of the colours to be displayed and is obtained from the block 6. This block 6 is the last amplifier after the second demodulator in a colour television receiver. Thus the signal $f_{sc}'$ is a colour signal modulated on the sub-carrier with frequency $f_{sc}$. (It may be remarked that the sub-carrier itself may be suppressed.) Thus at the output of 5 a sequential signal of frequency $f_w$ for application to the display tube control electrode is obtained. To the signal of $f_w$ is added in adder circuit 7 the monochrome component M obtained from the block 8. The signal $M + f_w$ is applied to the control electrode C. If this signal $M + f_w$ is in fact applied to the tube T, it may be shown that the resulting system is unstable because the colour signal has an undesirable effect on the indexing signal. This is true regardless of whether the means I operate on a photo-electric basis or on a secondary-emission basis, but it is convenient to describe the effect assuming means I to be a photocell. Consider for example the effect of the colour signals shown in FIGURE 2. If the indexing device is a blue-sensitive photocell, then when it is desired to display either saturated green or saturated yellow (FIGURES 2B, 2D), the indexing signal is reduced to zero amplitude.

Figure 4:
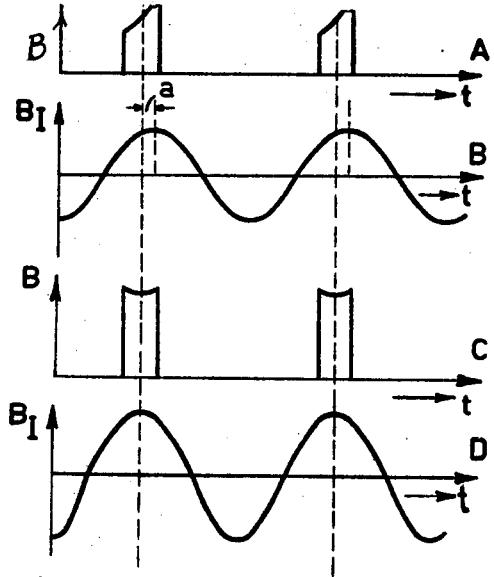
FIG. 4 shows some further graphs for explanation of the undesired phase shift which occurs in the indexing signal developed in the circuit arrangement of FIG. 3.

Display of a desaturated green (FIGURE 2A) will produce an indexing signal, but its phase is shifted. FIGURES 4A and 4B show how this occurs. While the spot is passing over the blue phosphor, the light output of the blue phosphor stripes 13 vary in a manner shown in FIGURE 4A. The output of the photocell I with its tuned load 2 is the fundamental component of the indexing signal shown in FIG. 4B and the latter signal has its phase displaced in the direction shown by the arrow $a$.

By contrast, the indexing signal obtained for display of a desaturated yellow (FIGURE 2C) has the correct phase, as shown in FIGURE 4D because the light output of the blue phosphor stripes in this case is as shown in FIG. 4C.

The application of a colour signal to the display tube using such an indexing system thus causes unacceptable variations in the amplitude and phase of the indexing signal. In fact, cross-talk between the colour and indexing signals provides a positive feedback loop for the colour signal and instability can ensue.

It is the principal object of the present invention to provide an improved indexing circuit arrangement capable of operating in a stable manner and capable of reducing the phase caused by the aforementioned cross-talk to such an extent that they do not have a material effect on the colour rendering.

The indexing stripes and associated circuitry used in connection with the present invention may employ any suitable physical phenomenon, for example electrical conduction, ultra-violet emission or secondary emission. The position of the indexing stripes is not important provided that the indexing stripes pertaining to any one group of luminescent stripes bear the same relationship to that group as all other indexing stripes have to their respective luminescent groups, and provided also that at least two separate and distinct partial indexing signals can be obtained from each group of luminescent stripes. In particular, all the indexing stripes may be constituted by luminescent stripes of the screen or, conversely, all the indexing stripes may be stripes other than the luminescent stripes of the screen. As a further alternative, it is possible to have a mixed arrangement, for example two indexing stripes per group, one of which is constituted by a blue phosphor stripe of the screen while the other is an ultra-violet or secondary-emissive stripe located at a guard-band midway between two blue phosphor stripes. Yet another arrangement which is within the scope of the invention is the use of a mixed phosphor stripe as described in copending U.S. Patent application Serial No. 64,191, filed October 21, 1960, e.g. a mixture of two phosphors one of which emits ultra-violet for indexing purposes while the other emits light in a visible colour for display purposes.

As for the luminescent or display stripes, these may employ differing phosphors emitting light of differing colours or they may employ optical filter stripes to provide the various colours from a white phosphor.

If the luminescent stripes are used not only for display but also as indexing stripes, then the tube is simplified to the extent that it does not require separate indexing stripes; however, in this case the circuit arrangement requires the addition of photocells with colour filters for detecting the motion of the light spot. An example of each of these arrangements in accordance with the invention will now be described with reference to FIGURES 5 to 9 of the accompanying diagrammatic drawings as applied to a tri-colour television display system suitable for a colour television receiver.

In a typical case, the width of each of the phosphor stripes G, R and B may be 0.25 mm., and the guard-bands 2 may have the same width, giving an over-all width of 1.5 mm. for each luminescent triplet (this arrangement can be represented by FIGURE 1). With such dimensions the individual coloured stripes are not resolved by the eye at normal viewing distances. In the following description it will be assumed that the stripe structure is vertical and that deflection means (not shown) are provided for causing horizontal line scanning and field scanning.

It will also be assumed for the purposes of the description that the colour video signal is available in dot-sequential form consisting of a colour component at subcarrier frequency $f_{sc}$ together with a monochrome component. Such colour signal may be derived from the equivalent NTSC signal by application of a signal processing known as "Y to M conversion and sub-carrier modification." For example, it is known that the NTSC signal can be utilized with tubes suitable for dot-sequential display without producing unduly large colour errors and, in this case, the colour signal would be available in the form of chrominance and luminance components.

Figure 5:
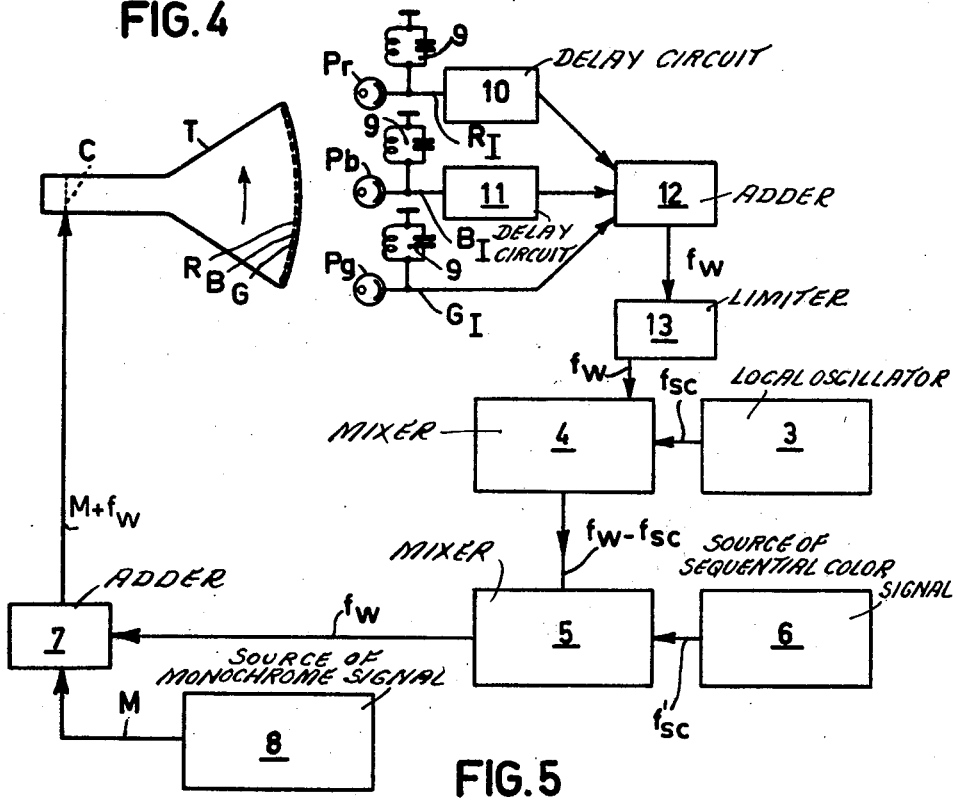
FIG. 5 shows a first embodiment of an arrangement in accordance with the present invention.

FIGURE 5 shows in plan view a display tube T having a vertical array of phosphor stripes, R, B, G laid on the tube screen support in such a manner that the electron beam impinging on them causes the emission of light of different primary colours in a fixed recurring order. This order is, in the example described, taken to be red, blue, green, red, blue, green . . . , although the exact order in which the phosphors luminesce is not important so long as the sequence is a so-called continuous one.

Placed in a position where light emitted from the array of phosphors can impinge upon them are three photocells one of which ($P_r$) is sensitive to red light only, one to blue light only ($P_b$), and the third ($P_g$) to green light only. Such sensitivity may be obtained, by interposing between each photocell and the display tube screen an appropriate coloured filter. Each photocell has a load 9 associated with it consisting of a tuned circuit which has a resonant frequency signal equal to the frequency at which the triplets of phosphor stripes are scanned by the electron beam i.e. the writing frequency $f_w$.

Figure 6A:
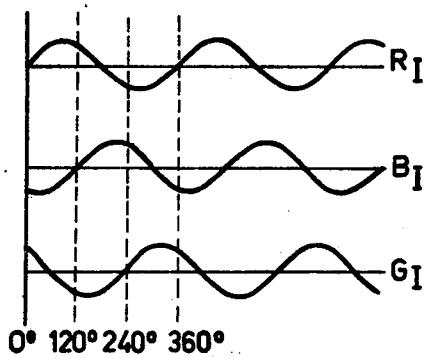

If an unvarying voltage is applied to the beam-intensity control electrode C of the display tube T, so that the electron beam current remains constant as the screen of the tube is scanned, then each of the three photocells will generate an "indexing" signal having an approximately sinusoidal waveform whose frequency is equal to the writing frequency $f_w$ and each of these signals will be at 120° phase with respect to the other two. FIGURE 6A shows the relationship between the signals $R_I$, $B_I$ and $G_I$ which are the indexing signals obtained respectively from the photocells $P_r$, $P_b$ and $P_g$ with their associated loads 9. These three signals are now passed, so far as necessary, through separate phase-shifting or delay circuits so that they are brought into the same phase with respect to each other. FIGURE 5 shows delay circuits whereby the signal $R_I$ from the red-sensitive photocell $P_r$ is delayed by 240° in a delay circuit 10 while the signal $B_I$ from the blue-sensitive photocell $P_b$ is delayed by 120° in a delay circuit 11, so that these two signals are brought into the same phase as the signal $G_I$ from the green-sensitive photocell $P_g$ which is not delayed at all. Another method of bringing the signals to the same phase is to delay the "red" signal by 60°, to advance the "blue" signal by 60°, and to invert the "green" signal. The exact manner in which the phase-shifting is performed is unimportant provided that all three signals are brought to substantially the same phase (FIGURE 6B) when an unvarying voltage is applied to the electrode C. These three signals are now added in an adder circuit 12, the resultant output signal of this circuit 12 being shown in FIGURE 6C.

Consider now the effect of applying a varying signal to the control electrode C of the display tube T, so that areas of varying brightness and hue are produced at the screen of the tube T. Each of the three signals $R_I$, $B_I$ and $G_I$ generated by the photocells $P_r$, $P_b$ and $P_g$ will suffer variations in both amplitude and phase. However, the final signal obtained from the phase-shifting 10, 11 and adding 12 circuits remains substantially invariant in phase under all conditions, and its amplitude remains substantially proportional to the mean level of the display tube beam current.

Figure 6D:
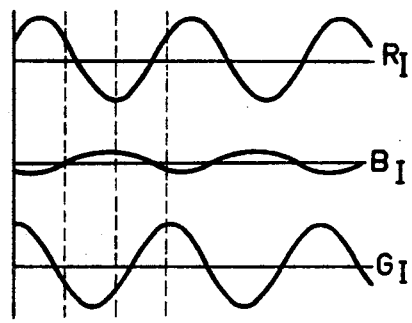
Figure 6:
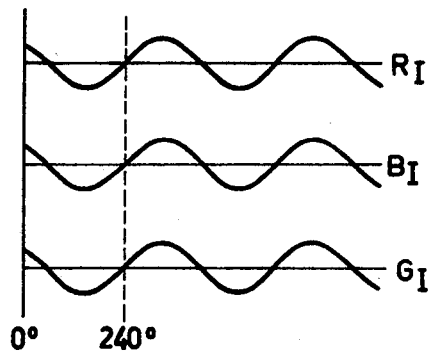
Figure 6E:
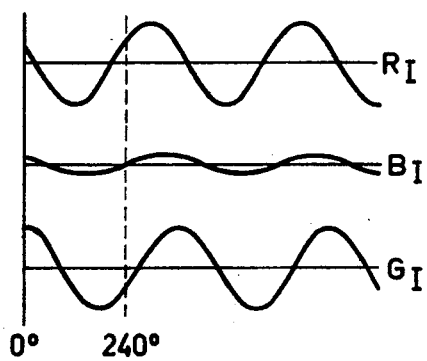
Figure 6C:
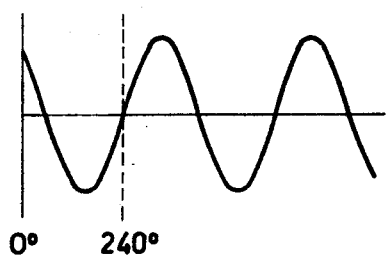
Figure 6F:
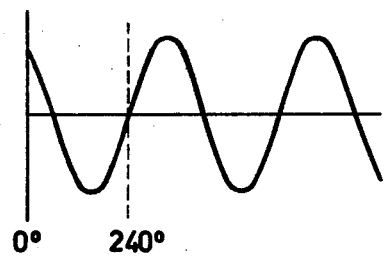

FIGURE 6D shows typical variations which may occur in the "red" $R_I$, "blue" $B_I$ and "green" $G_I$ photocell signals, and FIGURE 6E shows these signals after passing through the phase-shifting circuits 10 and 11. The final signal obtained from the phase-shifting 10, 11 and adding 12 circuits is shown in FIGURE 6F, and is seen to remain substantially undisturbed with respect to FIG. 6C. This final indexing signal $f_w$, if amplified and passed through an amplitude-limiting circuit 13 to remove any variations due to changes in the mean level of beam current in the cathode-ray tube T, is therefore substantially free from variations caused by changes in the video signal applied to the control electrode C of the display tube T, and may be used for indexing purposes in the normal manner of beam-indexing systems. This may be done with the aid of the typical circuitry shown, which operates as follows.

The constant-amplitude indexing signal $f_w$ is injected into a first frequency changer or mixer stage 4 with the regenerated subcarrier signal $f_{sc}'$ and the difference component ($f_w - f_{sc}$) is selected at the output of 4. This difference frequency signal ($f_w - f_{sc}$) is then injected into a second frequency changer stage 5 with the chrominance or sequential colour component $f_{sc}'$ of the video signal, the writing frequency component $f_w$ with colour information being selected at the output of 5. This output signal $f_w$ thus contains the phase and amplitude variations of the sequential colour signal $f_{sc}'$ and the subsequent addition of the monochrome component M renders it suitable for application to the control electrode C of the display tube T.

Another method of producing an indexing signal will now be described.

FIGURE 7 shows a horizontal cross-section through the screen of a suitable display tube T. On the glass screen support 14 are laid in the normal manner phosphor stripes R, B and G in a continuously recurring order, guard-bands 2 of nonluminescing material being laid between the phosphor stripes. On the gun side of the phosphor stripes there are laid stripes $15_1$, $15_2$ and $15_3$ of an electron-permeable conducting material, for example aluminium film, each of these stripes being insulated from each other. The number of conducting stripes laid behind one triplet of phosphors is unimportant provided that the same integral number of stripes is laid behind each triplet and that there is more than one stripe per triplet. In the example shown, three conducting stripes are laid behind one colour triplet (each conducting stripe covering a phosphor stripe). All the conducting stripes (15) laid in a similar position with respect to the colour triplets are connected electrically together and taken to an electrode to which external connections may be made. Thus, all the conducting stripes $15_1$ are connected together, all those marked $15_2$ are connected together, all those marked $15_3$ are connected together. Three indexing signals $R_I$, $B_I$ and $G_I$ may thus be taken from the tube through the corresponding through connection of the electrodes $15_1$, $15_2$ and $15_3$. As the electron beam sweeps across the screen, the beam current passes in turn (as a return path) through each of the electrode systems $15_1$, $15_2$ and $15_3$ producing pulses in each of these electrode systems at a rate equal to the writing frequency. To each of the three through connections is connected a load consisting of a tuned circuit resonant at the writing frequency as shown in FIGURE 5, while the remainder of the circuitry can also be as shown in FIG. 5.

If a different number of conducting stripes per colour triplet is used, for example two stripes per triplet, then two signals will be taken from two electrode systems of the tube. If the beam current is constant (i.e. in the absence of beam modulation) these signals will be phased at 180° intervals, and in this case the two partial signals can be brought into the same phase merely by inverting one or the other signal.

The arrangement of FIGURE 5, or a corresponding arrangement using conductive stripes as described with reference to FIGURE 7, may readily be adapted for use in systems employing only two phosphor stripes of differing colour response in each element of the phosphor pattern. Such a pattern may, for example, employ alternate orange and cyan stripes for two-colour display of a colour television picture. The partial indexing signal derived from one set of phosphors or conductive stripes can be shifted in phase by 180° (e.g. by inversion) and then added to the other partial indexing signal so as to be substantially in phase therewith and provide the desired final indexing signal.

Such a system is shown in FIGURES 8 and 9. Here only two-index photocells P1 and P2 and one adder circuit 12 are shown which corresponds, in function, to the three-cell circuit of FIGURE 5 (the remaining circuitry may be as in FIGURE 5 and is omitted for simplicity). In this circuit the photocell P1 provides its output from its tuned anode load 9, while photocell P2 has the tuned circuit 9 forming the load connected to its cathode. In FIG. 8 the guard-bands 2 between "red" R and "green" G phosphor stripes are replaced by luminescent stripes U which emit ultraviolet light when impinged by the electron beam. So if photocell P is only sensitive to ultraviolet light and cell P2 is only sensitive to blue light stripes U and B can function as indexing stripes. Since the indexing stripes U are symmetrically disposed between indexing stripes B (which thus perform two functions), the two partial indexing signals are nominally 180° apart. However, the disposition of the load of P1 in its anode load has the effect of inverting its partial index signal $U_I$, while no inversion takes place with the partial index signal $B_I$ in the P2 circuit. Thus the two output signals $U_I$ and $B_I$ can be added without prior phase-shifting, and do not even require separate circuitry for inverting one of the signals. The indexing stripes may also be two equally spaced sets of ultraviolet emissive stripes one on each side of the screen as described in the aforesaid U.S. patent application Serial No. 64,191. In practice, some degree of amplification will be desirable either before or after addition, but this is equally true in the photocell arrangement of FIGURE 5.

FIGURE 9 shows an alternative two-cell circuit. In this circuit the cell outputs are both taken from the anodes and are therefore 180° apart. However, these signals are applied to opposite ends of a centre-tapped primary of a transformer 16. Capacitors 17, 18 and 19 are added to tune the whole circuit to the desired writing frequency $f_w$. If desired some damping resistors 20 and 21 may be connected to the primary winding of transformer 16.

The circuit 16–21 performs, in effect, both the phase-shifting and adding functions. Again, it may be desirable to provide amplification before or after the transformer 16. As for the indexing stripes used, the same remarks apply as in the case of FIGURE 8. It may in practice be desirable to provide the resistors 20 and 21 as an adjustable potentiometer for balancing the circuit against unequal sensitivities in the two cells P1 and P2.

A tricolour system using only two partial indexing signals can readily provide stability. Stability, for the purposes of this specification, may be regarded as the condition in which the colour rendering of the system, although possibly incorrect, remains constant for a given colour signal. In the particular case of a system which employs a colour signal which is a sine-wave of constant frequency with a varying phase which represents hue, this stability may be regarded as the condition in which there is a substantially fixed hue in the colour rendering for any given phase of the colour signal. For some applications the residual phase errors may be acceptable. Where this is not the case, it is possible to compensate for these stable errors by the method described in copending U.S. patent application Serial No. 89,141, filed Feb. 4, 1961.

In the examples described it will be seen that there is the further advantage that the indexing control circuit is automatically self-starting without the need for any additional means or any restrictions on the mode of operation. This feature is due to the continuous presence of the monochrome component M (e.g. in FIGURE 5 it is applied to the electrode C of the tube T through no other circuitry than one adding circuit), whereas in most other systems, all the signals applied to the control electrode are gated by gating pulses and these, in turn, are derived from the indexing signals. With these known arrangements, some means must be provided to generate an initial gating-on pulse at the beginning of each line to ensure that beam current strikes at least one indexing stripe which can then start the operation of the control circuits. A similar problem arises if the beam current drops to zero in the middle of a line because of the presence of a block area in the picture. There are methods of overcoming both these problems in known systems, but they entail additional circuitry or some degradation of the picture or both. In the arrangements described herein, the monochrome component is present at the beginning of each line, and will re-appear after any black area of the picture, and this component is sufficient, by itself, to re-start the indexing control mechanism.

Whereas the examples have been described in terms of vertical stripes swept by a horizontal line scanning motion, there is the equivalent alternative of a horizontal stripe structure combined with a vertical spot-wobble motion of the beam as it performs the horizontal line scan. Of course, for this arrangement to be equivalent to that of the examples, the spot-wobble must have substantially a sawtooth waveform with a substantially negligible fly-back period and an amplitude equal to the width of one group of luminescent stripes.

As in most indexing systems, it is possible to use the indexing signal to adjust the rate of scanning instead of using it (as herein described) to adjust the phasing of the colour signal so as to maintain the correct time relationship between the colour signal and the instantaneous beam position. However, as with other systems, it is in practice greatly preferable to effect control by the second method.

What is claimed is:

1. A beam-indexing color television display system comprising a cathode ray tube having an electron gun for producing an electron beam, said gun having a beam intensity control electrode, and a screen disposed in the path of said beam, said screen having an iterative pattern of groups of at least two stripes of material luminescent at different colors, means for deflecting said beam whereby said beam scans said stripes in a continuous sequence, a source of a substantially sinusoidal color signal having amplitude and phase-dependent upon the hue and saturation of an image to be displayed, said sinusoidal signal having a period equal to the time said beam scans one group of said stripes, means for generating at least two substantially sinusoidal partial indexing signals during the time said beam scans each of said groups, means for shifting the phase of at least one of said partial indexing signals whereby said partial indexing signals are brought to substantially the same phase in the absence of modulation of said beam, means for adding said in-phase indexing signals to provide a final substantially sinusoidal indexing signal, and means for controlling the relative phase of said final indexing signal and said color signal.

2. A beam-indexing color television display system comprising a cathode ray tube having an electron gun for producing an electron beam, said gun having a beam intensity control electrode, and a screen disposed in the path of said beam, said screen having an iterative pattern of groups of at least two stripes of material luminescent at different colors, means for deflecting said beam whereby said beam scans said stripes in a continuous sequence in a direction normal to said stripes, a source of a substantially sinusoidal color signal having amplitude and phase dependent upon the hue and saturation of an image to be displayed, said sinusoidal signal having a period equal to the time said beam scans one group of said stripes, means for generating a plurality of substantially sinusoidal partial indexing signals during the scanning of each said group, said indexing signals having the same relationship to the stripes in each said group and being symmetrical with respect to each group, means for shifting the phase of at least one of said indexing signals to bring the indexing signals produced during the scanning of each group in phase in the absence of beam modulation, means for adding the in-phase indexing signals to produce a final indexing signal, and means responsive to said final indexing signal connected to control the relative phase of said final indexing signal and said color signal.

3. The display system of claim 2, in which said screen has iterative patterns of groups of three said stripes, and means for generating two partial indexing signals during the scanning of each said group.

4. The system of claim 3, in which said means for generating two partial indexing signals comprises means for generating an indexing signal responsive to the passage of said beam over one stripe of each group, and means for generating an indexing signal responsive to the passage of said beam between the other two stripes of each group.

5. The display system of claim 2, in which said screen has iterative patterns of groups of three said stripes, and means for generating three partial indexing signals each responsive to the scanning of a separate stripe by said beam.

6. In a color television system of the type having a cathode ray tube with a plurality of groups of stripes of material that luminesce with different colors, means for directing an electron beam modulated with color information toward said stripes, and means for scanning said beam across said stripes, means for deriving an indexing signal for indicating the instantaneous position of said beam with respect to said stripes, and means responsive to said indexing signal for controlling the relative phase of said indexing signal and the instantaneous position of said beam with respect to said stripes for producing the desired display on said cathode ray tube, said means for deriving an indexing signal comprising means for deriving a plurality of substantially sinusoidal partial indexing signals during the scanning of each group of stripes, said partial indexing signals being responsive to the impinging of said beam on different portions of said groups symmetrical with respect to the stripes of said group and having the same relationship with respect to the stripes of all groups of stripes, means for shifting the phase of at least one of said partial indexing signals whereby all of said partially indexing signals are brought to the same phase, and means for adding said partial indexing signals of the same phase to produce said first-mentioned indexing signal.

References Cited in the file of this patent
UNITED STATES PATENTS
2,752,418    Clapp _____ June 26, 1956